(12) United States Patent
Kim et al.

(10) Patent No.: US 10,205,191 B2
(45) Date of Patent: Feb. 12, 2019

(54) ELECTROLYTE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Duck-Hyun Kim, Yongin-si (KR); Moon-Sung Kim, Yongin-si (KR); Jeong-Hye Lee, Yongin-si (KR); Sang-Il Han, Yongin-si (KR); Pavel Alexandrovich Shatunov, Yongin-si (KR); Woo-Cheol Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 369 days.

(21) Appl. No.: 14/706,937

(22) Filed: May 7, 2015

(65) Prior Publication Data

US 2016/0013518 A1     Jan. 14, 2016

(30) Foreign Application Priority Data

Jul. 11, 2014 (KR) .................. 10-2014-0087670

(51) Int. Cl.
*H01M 10/0569* (2010.01)
*H01M 10/0567* (2010.01)
(Continued)

(52) U.S. Cl.
CPC ..... *H01M 10/0569* (2013.01); *H01M 10/052* (2013.01); *H01M 10/0567* (2013.01);
(Continued)

(58) Field of Classification Search
CPC combination set(s) only.
See application file for complete search history.

(56) References Cited

U.S. PATENT DOCUMENTS

| 6,495,293 | B1 * | 12/2002 | Arai | .......... H01G 9/022 |
| | | | | 429/224 |
| 6,955,867 | B1 | 10/2005 | Otsuki et al. | |

(Continued)

FOREIGN PATENT DOCUMENTS

| CN | 1220029 A | 6/1999 |
| CN | 102263292 A | 11/2011 |

(Continued)

OTHER PUBLICATIONS

Britannica.com definition of a 5-membered rings with one heteroatom.*

(Continued)

*Primary Examiner* — Kaity V Chandler
(74) *Attorney, Agent, or Firm* — Lewis Roca Rothgerber Christie LLP

(57) ABSTRACT

An electrolyte for a rechargeable lithium battery includes a lithium salt, an organic solvent, and an additive. The organic solvent includes a sulfur-containing compound represented by Chemical Formula 1 and a fluoroalkyl ether, and the additive includes a phosphazene compound represented by Chemical Formula 3. A rechargeable lithium battery including the electrolyte may have improved cycle-life characteristics and safety.

Chemical Formula 1

(Continued)

-continued

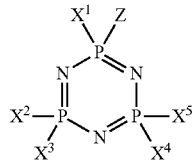

Chemical Formula 3

19 Claims, 2 Drawing Sheets (51) Int. Cl.
*H01M 10/052* (2010.01)
*H01M 10/0568* (2010.01)

(52) U.S. Cl.
CPC .... *H01M 10/0568* (2013.01); *H01M 2220/30* (2013.01); *H01M 2300/0034* (2013.01); *H01M 2300/0037* (2013.01)

(56) References Cited

U.S. PATENT DOCUMENTS

| | | | |
|---|---|---|---|
| 7,476,468 B1 | 1/2009 | Lam et al. | |
| 8,767,376 B2 | 7/2014 | Takahashi et al. | |
| 2004/0191635 A1* | 9/2004 | Otsuki | H01M 10/0567 429/326 |
| 2012/0141878 A1* | 6/2012 | Ohashi | H01M 10/0567 429/300 |
| 2013/0295470 A1* | 11/2013 | Shatunov | C07F 9/65815 429/338 |
| 2013/0330609 A1 | 12/2013 | Sawa et al. | |
| 2014/0038059 A1 | 2/2014 | Li et al. | |
| 2014/0178772 A1* | 6/2014 | Jeong | H01M 10/052 429/341 |
| 2015/0303521 A1 | 10/2015 | Sasaki et al. | |

FOREIGN PATENT DOCUMENTS

| | | |
|---|---|---|
| CN | 103384016 A | 11/2013 |
| EP | 1 376 732 A1 | 1/2004 |
| JP | 4257725 B2 | 4/2009 |
| KR | 10-0775566 B1 | 11/2007 |
| KR | 10-2012-0090095 A | 8/2012 |
| KR | 10-2014-0034179 A | 3/2014 |
| KR | 10-2014-0083170 A | 7/2014 |
| WO | WO 2014/080871 A1 | 5/2014 |

OTHER PUBLICATIONS

EPO Search Report dated Nov. 6, 2015, for corresponding European Patent application 15174251.7, (7 pages).
Arai, J., A novel non-flammable electrolyte containing methyl nonafluorobutyl ether for lithium secondary batteries, Journal of Applied Electrochemistry, 2002, pp. 1071-1079, vol. 32.
Arai, J., Nonflammable Methyl Nonafluorobutyl Ether for Electrolyte Used in Lithium Secondary Batteries, Journal of the Electrochemical Society, 2003, pp. A219-A228, vol. 150 (2), The Electrochemical Society.
Naoi, K. et al., Nonflammable Hydrofluoroether for Lithium-Ion Batteries: Enhanced Rate Capability, Cyclability, and Low-Temperature Performance, Journal of the Electrochemical Society, 2009, pp. A272-A276, vol. 156 (4), The Electrochemical Society.
EPO Office Action dated Aug. 24, 2017, for corresponding European Patent Application No. 15174251.7 (7 pages).
Chinese Office Action dated Sep. 28, 2018 in corresponding Chinese Patent Application No. 201510329216.7 (11 pages) and accompanying Search Report (12 pages).

* cited by examiner

ELECTROLYTE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0087670 filed in the Korean Intellectual Property Office on Jul. 11, 2014, the entire content of which is incorporated herein by reference.

BACKGROUND

1. Technical Field

Aspects of embodiments of the present invention are directed to an electrolyte for a rechargeable lithium battery and a rechargeable lithium battery including the same.

2. Description of the Related Art

The recent development of smaller and lighter weight portable electronic devices has created a demand for high energy batteries as power sources for such devices.

A rechargeable lithium battery is typically manufactured by injecting an electrolyte into an electrode assembly, which includes a positive electrode including a positive active material capable of intercalating/deintercalating lithium ions, and a negative electrode including a negative active material capable of intercalating/deintercalating lithium ions.

The electrolyte typically includes an organic solvent in which a lithium salt is dissolved. The electrolyte provides stability and enables performance of the rechargeable lithium battery.

The ignition and combustion of the electrolyte may be caused by a radical chain reaction of a gas state. Accordingly, a self-extinguishing material may be added to the electrolyte. The self-extinguishing material reacts with the active radicals (H and .OH) produced by the combustion reaction and suppresses (or reduces) the radical chain reaction, thus providing the electrolyte with improved flame retardancy. However, while the self-extinguishing material may improve the flame retardancy of the electrolyte, it may also deteriorate battery performance.

SUMMARY

In one embodiment, an electrolyte for a rechargeable lithium battery can facilitate improved performance and safety of the rechargeable lithium battery.

In another embodiment, a rechargeable lithium battery includes the electrolyte.

In one embodiment, an electrolyte for a rechargeable lithium battery includes a lithium salt, an organic solvent including a sulfur-containing compound represented by Chemical Formula 1, and fluoroalkyl ether, and an additive including a phosphazene compound represented by Chemical Formula 3.

Chemical Formula 1

In Chemical Formula 1, $R^1$ to $R^8$ are each independently a hydrogen atom, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C6 to C30 cycloalkynyl group, or a substituted or unsubstituted C6 to C30 aryl group.

Chemical Formula 3

In Chemical Formula 3, $X^1$ to $X^5$ are each independently a halogen or a halogen-containing group.

Also, Z is $NR^9R^{10}$ or $OR^{11}$, where $R^9$ and $R^{10}$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C1 to C30 haloalkyl group, a substituted or unsubstituted C6 to C30 aryl group, a substituted or unsubstituted C6 to C30 halogenated aryl group, a substituted or unsubstituted C7 to C20 arylalkyl group, a substituted or unsubstituted C1 to C20 heteroalkyl group, a substituted or unsubstituted C2 to C30 heterocycloalkyl group, a substituted or unsubstituted C2 to C30 heteroaryl group, or a substituted or unsubstituted C1 to C20 aldehyde, and $R^{11}$ is a substituted or unsubstituted C1 to C30 alkyl group.

In some embodiments, in Chemical Formula 1, $R^1$ to $R^8$ may each independently be a hydrogen atom or a substituted or unsubstituted C1 to C30 alkyl group.

The sulfur-containing compound of Chemical Formula 1 may be present in an amount of about 1% by volume to about 20% by volume based on the total amount of the organic solvent.

The fluoroalkyl ether may be represented by Chemical Formula 2.

Chemical Formula 2

In Chemical Formula 2, $R^{12}$ and $R^{13}$ are each independently a C1 to C10 alkyl group substituted with at least one fluorine atom.

In some embodiments, $R^{12}$ and $R^{13}$ may each independently be a C1 to C6 alkyl group substituted with 5 to 12 fluorine atoms.

In some embodiments, the C1 to C10 alkyl group may be a linear C1 to C10 alkyl group.

The fluoroalkyl ether may be present in an amount of about 1% by volume to about 40% by volume based on the total amount of the organic solvent.

In Chemical Formula 3, at least one of $X^1$ to $X^5$ may be a halogen. In some embodiments, $X^1$ to $X^5$ are each inde- pendently a halogen, and in some embodiments, $X^1$ to $X^5$ are each independently a fluorine atom.

In some embodiments, in Chemical Formula 3, Z may be $NR^9R^{10}$, where $R^9$ and $R^{10}$ are each independently a substituted or unsubstituted C1 to C30 alkyl group or a substituted or unsubstituted C1 to C30 cycloalkyl group.

In some embodiments, Z may be $OR^{11}$, where $R^{11}$ is a substituted or unsubstituted C1 to C30 alkyl group.

In some embodiments, Z may be $OR^{11}$, where $R^{11}$ is a substituted or unsubstituted C1 to C5 alkyl group.

The phosphazene compound of Chemical Formula 3 may be represented by any of the following Chemical Formulae 4 to 6.

Chemical Formula 4

Chemical Formula 5

Chemical Formula 6

The phosphazene compound may be present in an amount of about 1 part by weight to about 20 parts by weight based on 100 parts by weight of the organic solvent.

The organic solvent may further include a carbonate-based compound such as diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or a combination thereof.

The additive may further include fluoroethylene carbonate, vinylethylene carbonate, propane sultone, succinonitrile, adiponitrile, $LiBF_4$, or a combination thereof.

The electrolyte may have a viscosity of less than or equal to about 8 cP.

The electrolyte may have an ion conductivity of greater than or equal to about 5 mS/cm.

In some embodiments, a rechargeable lithium battery includes a positive electrode, a negative electrode, a separator, and the electrolyte.

Other variations are included in the following detailed description.

According to embodiments of the present invention, a rechargeable lithium battery having improved performance and safety may be realized.

DETAILED DESCRIPTION

Hereinafter, some exemplary embodiments are described. However, these embodiments are exemplary, and this disclosure is not limited thereto. As those skilled in the art would realize, the described embodiments may be modified in various different ways, all without departing from the spirit or scope of the present invention. Accordingly, the drawings and description are to be regarded as illustrative in nature and not restrictive.

As used herein, the term "and/or" used with a list of elements, includes any and all combinations of one or more of the elements on the list. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

As used herein, when a definition is not otherwise provided, the term "substituted" refers to a compound in which at least one hydrogen atom is substituted with at least one of a halogen (e.g., F, Br, Cl or I), a hydroxyl group, an alkoxy group, a nitro group, a cyano group, an amino group, an azido group, an amidino group, a hydrazine group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and combinations thereof.

As used herein, when a definition is not otherwise provided, the term 'hetero' refers to a compound or a functional group including 1 to 3 hetero atoms selected from N, O, S, and P as ring atoms or main chain atoms.

An electrolyte for a rechargeable lithium battery according to some embodiments includes a lithium salt, an organic solvent, and an additive.

The organic solvent may include a sulfur-containing compound and a fluoroalkyl ether.

The sulfur-containing compound may be represented by Chemical Formula 1.

Chemical Formula 1

In Chemical Formula 1, $R^1$ to $R^8$ are each independently a hydrogen atom, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C6 to C30 cycloalkynyl group, or a substituted or unsubstituted C6 to C30 aryl group.

The sulfur-containing compound represented by Chemical Formula 1 may lower the vapor pressure of the electrolyte and, as a high voltage additive, may facilitate oxidation safety. When the sulfur-containing compound is included in the electrolyte, the sulfur-containing compound may lower the coordination number of lithium, and thus may increase ion conductivity. Accordingly, since the sulfur-containing compound may affect lithium mobility, battery rate capability may be improved.

In the sulfur-containing compound of Chemical Formula 1, $R^1$ to $R^8$ may each independently be a hydrogen atom or a substituted or unsubstituted C1 to C30 alkyl group. In some embodiments, $R^1$ to $R^8$ may each be a hydrogen atom, and the sulfur-containing compound may be sulfolane.

The sulfur-containing compound may be included (or be present) in an amount of about 1% by volume to about 20% by volume, and in some embodiments, about 1% by volume to about 15% by volume, about 1% by volume to about 10% volume, or about 1% by volume to about 5% by volume, based on the total amount of the organic solvent. When the sulfur-containing compound is included within any of these ranges, the flash point of the electrolyte can be increased, and thus flame retardancy may be improved. In addition, ion conductivity may also be increased, thus improving the performance of the rechargeable lithium battery.

In some embodiments, the fluoroalkyl ether includes a fluoroalkyl group having at least one C—F bond. Since a C—F bond has higher bond strength and is more thermodynamically stable than a C—C bond, a fluoroalkyl group can have improved thermal stability and electrochemical stability. Accordingly, when the fluoroalkyl ether along with the sulfur-containing compound are included in the electrolyte, flame retardancy and battery stability may be improved. Furthermore, the fluoroalkyl ether may have good miscibility with other organic solvents, when the fluoroalkyl ether is mixed other organic solvents.

In some embodiments, the fluoroalkyl ether may be represented by Chemical Formula 2.

Chemical Formula 2

In Chemical Formula 2, $R^{12}$ and $R^{13}$ are each independently a C1 to C10 alkyl group substituted with at least one fluorine atom.

In some embodiments, in the fluoroalkyl ether of Chemical Formula 2, $R^{12}$ and $R^{13}$ may each independently be a C1 to C6 alkyl group substituted with 5 to 12 fluorine atoms. When the number of carbon atoms in the main chain and the number of fluorine atom substituents are both within the described ranges, good flame retardancy may be obtained.

In the fluoroalkyl ether of Chemical Formula 2, the alkyl group substituted with fluorine may have a linear structure or a branched structure. In some embodiments, for example, the fluoroalkyl ether may have the linear structure.

The fluoroalkyl ether may be included (or be present) in an amount of about 1% by volume to about 40% by volume, and in some embodiments, about 1% by volume to about 30% by volume, about 1% by volume to about 20% by volume, or about 1% by volume to about 10% by volume, based on the total amount of the organic solvent. When the amount of the fluoroalkyl ether is within any of these ranges, good flame retardancy may be obtained, and battery performance (rate capability and the like) may be improved by maintaining a desired viscosity.

The organic solvent may further include a carbonate-based compound in addition to the sulfur-containing compound and the fluoroalkyl ether.

The carbonate-based compound may include, without limitation, diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or a combination thereof.

In some embodiments, an ester-based compound, an ether-based compound, a ketone-based compound, an alcohol-based compound, or a combination thereof may be included in the organic solvent together with the carbonate-based compound.

Non-limiting examples of the ester-based compound include methylacetate, ethylacetate, n-propylacetate, dimethylacetate, methylpropionate, ethylpropionate, γ-butyrolactone, decanolide, valerolactone, mevalonolactone, caprolactone, and the like. Non-limiting examples of the ether-based compound include dibutylether, tetraglyme, diglyme, dimethoxyethane, 2-methyltetrahydrofuran, tetrahydrofuran, and the like. Non-limiting examples of the ketone-based compound include cyclohexanone, and the like. Non-limiting examples of the alcohol-based compound include ethanol, isopropyl alcohol, and the like.

The additive may include a phosphazene compound represented by Chemical Formula 3.

Chemical Formula 3

In Chemical Formula 3, $X^1$ to $X^5$ are each independently a halogen or a halogen-containing group.

Also, Z is $NR^9R^{10}$ or $OR^{11}$, where $R^9$ and $R^{10}$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C1 to C30 haloalkyl group, a substituted or unsubstituted C6 to C30 aryl group, a substituted or unsubstituted C6 to C30 halogenated aryl group, a substituted or unsubstituted C7 to C20 arylalkyl group, a substituted or unsubstituted C1 to C20 heteroalkyl group, a substituted or unsubstituted C2 to C30 heterocycloalkyl group, a substituted or unsubstituted C2 to C30 heteroaryl group, or a substituted or unsubstituted C1 to C20 aldehyde, and $R^{11}$ is a substituted or unsubstituted C1 to C30 alkyl group.

In a rechargeable lithium battery, an electrolyte or an oxide-based positive active material can decompose during firing to produce oxygen. However, the phosphazene compound of Chemical Formula 3 may capture oxygen generated during firing, and thus may prevent (or reduce) combustion. In addition, the phosphazene compound may work as a film decomposition additive and form a film having low resistance. Accordingly, the resulting rechargeable lithium battery may have improved performance.

When the sulfur-containing compound and the fluoroalkyl ether as the organic solvent, and the phosphazene compound as the additive, are included in the electrolyte, the resulting battery may have improved stability and performance.

In some embodiments, in the phosphazene compound of Chemical Formula 3, at least one of $X^1$ to $X^5$ may be a halogen. In some embodiments, $X^1$ to $X^5$ may each independently be a halogen, and in some embodiments, $X^1$ to $X^5$ may each independently be a fluorine atom.

In Chemical Formula 3, when Z is $NR^9R^{10}$, $R^9$ and $R^{10}$ may each independently be a substituted or unsubstituted C1 to C30 alkyl group or a substituted or unsubstituted C1 to C30 cycloalkyl group.

In some embodiments, Z may be an alkoxy group such as $OR^{11}$. When Z is an alkoxy group such as $OR^{11}$, the electrolyte may have a high flash point and good self-extinguishing characteristics, and thus good flame retardancy may be obtained. In some embodiments, $R^{11}$ is a substituted or unsubstituted C1 to C30 alkyl group, and in some embodiments, a substituted or unsubstituted C1 to C5 alkyl group.

The phosphazene compound represented by Chemical Formula 3 may be represented by any one of the following Chemical Formulae 4 to 6.

Chemical Formula 4

Chemical Formula 5

Chemical Formula 6

The phosphazene compound may improve the flame retardancy of the electrolyte, without substantially deteriorating battery performance.

The phosphazene compound may be included (or be present) in an amount of about 1 part by weight to about 20 parts by weight, and in some embodiments, about 3 parts by weight to about 20 parts by weight, about 3 parts by weight to about 15 parts by weight, or about 3 parts by weight to about 10 parts by weight, based on 100 parts by weight of the organic solvent. When the phosphazene compound is included within any of these ranges, the flash point of the electrolyte can be increased and good flame retardancy may be obtained, thus improving the stability of the battery without substantially deteriorating battery performance (e.g., rate capability, cycle-life characteristics and the like).

The additive may further include fluoroethylene carbonate, vinylethylene carbonate, propane sultone, succinonitrile, adiponitrile, $LiBF_4$, or a combination thereof, in addition to the phosphazene compound.

The fluoroethylene carbonate may be included (or be present) in an amount of about 3 parts by weight to about 50 parts by weight, and in some embodiments, about 5 parts by weight to about 20 parts by weight, based on 100 parts by weight of the organic solvent. The vinylethylene carbonate may be included (or be present) in an amount of about 0.1 parts by weight to about 2 parts by weight, and in some embodiments, about 0.3 parts by weight to about 1 part by weight, based on 100 parts by weight of the organic solvent. When the fluoroethylene carbonate and/or the vinylethylene carbonate are included within any of their respective ranges, an optimal (or desired) passivation film capable of improving the cycle-life characteristics of the battery may be formed on the negative electrode.

The propane sultone may be included (or be present) in an amount of about 1 part by weight to about 5 parts by weight, and in some embodiments, about 1.5 parts by weight to about 3 parts by weight, based on 100 parts by weight of the organic solvent. The succinonitrile may be included (or be present) in an amount of about 1 part by weight to about 10 parts by weight, and in some embodiments, about 2 parts by weight to about 7 parts by weight, based on 100 parts by weight of the organic solvent. When the propane sultone and/or the succinonitrile are included within any of their respective ranges, high temperature cycle-life characteristics may be improved, and increases in the thickness of the battery after being allowed to stand at a high temperature may be suppressed (or reduced).

The adiponitrile may be included (or be present) in an amount of about 0.1 parts by weight to about 10 parts by weight based on 100 parts by weight of the organic solvent. $LiBF_4$ may be included (or be present) in an amount of about 0.1 parts by weight to about 10 parts by weight based on 100 parts by weight of the organic solvent.

In some embodiments, the lithium salt is dissolved in the organic solvent and is the lithium ion source in the battery, thereby promoting the movement of lithium ions between the positive and negative electrodes and facilitating the basic operation of the rechargeable lithium battery.

The lithium salt may include, without limitation, $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2(C_yF_{2y+1}SO_2)$ (where x and y are natural numbers, e.g., an integer between 1 and 20), $LiCl$, $LiI$, $LiB(C_2O_4)_2$ (lithium bisoxalatoborate (LiBOB)), lithium bis(fluorosulfonyl)imide (LiFSI), or a combination thereof.

The concentration of the lithium salt may be about 0.1 M to about 2.0 M. When the concentration of the lithium salt is within this range, the electrolyte may have the desired conductivity and viscosity, and thus may effectively facilitate the movement of lithium ions and provide good electrolyte performance.

The viscosity of the electrolyte may be less than or equal to about 8 cP, and in some embodiments, less than or equal to about 5 cP, or about 4 cP to about 5 cP. When the viscosity of the electrolyte is within any of these ranges, good battery performance and rate capability may be obtained. The viscosity may be measured at room temperature (about 20° C. to about 25° C.).

The ion conductivity of the electrolyte may be greater than or equal to about 5 mS/cm, and in some embodiments, about 5 mS/cm to about 12 mS/cm, or about 6 mS/cm to about 9 mS/cm. When the ion conductivity of the electrolyte is within any of these ranges, good cycle-life characteristics may be obtained.

Hereinafter, a rechargeable lithium battery including the electrolyte is described with reference to FIG. 1.

Figure 1:
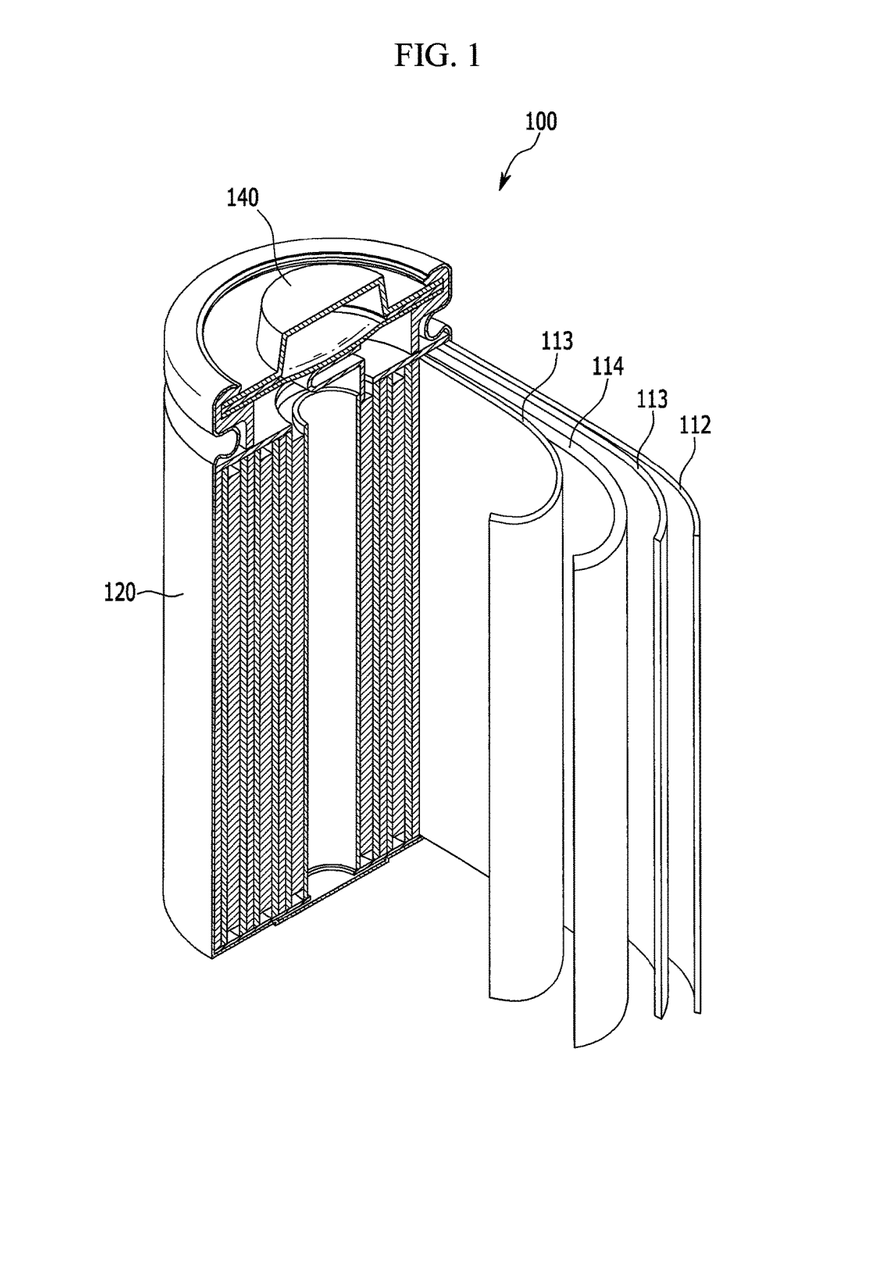
FIG. 1 is a cross-sectional perspective view of a rechargeable lithium battery according to embodiments.

FIG. 1 is a cross-sectional perspective view of a rechargeable lithium battery according to embodiments. Referring to FIG. 1, a rechargeable lithium battery 100 according to embodiments includes a positive electrode 114, a negative electrode 112 facing the positive electrode 114, a separator 113 between the negative electrode 112 and the positive electrode 114, an electrolyte impregnated into the separator 113, a battery case 120, and a sealing member 140 sealing the battery case 120.

The rechargeable lithium battery of embodiments of the present invention is not limited to any particular shape or kind of battery. For example, the rechargeable lithium battery may take the shape of a cylinder, a prism, a pouch, or the like, and may include the above described electrolyte.

In some embodiments, the positive electrode includes a positive current collector and a positive active material layer on the positive current collector. The positive active material layer includes a positive active material, a binder, and, optionally, a conductive material.

The positive current collector may be Al (aluminum), but is not limited thereto.

The positive active material may include lithiated intercalation compounds capable of reversibly intercalating and deintercalating lithium ions. In some embodiments, at least one composite oxide of lithium and a metal of cobalt, manganese, nickel, or a combination thereof may be used, and non-limiting examples of the composite oxide include compounds represented by the following chemical formulae:

$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, 0≤c≤0.05); $Lii_aE_{2-b}B_bO_{4-c}D_c$ (0.90≤a≤1.8, 0≤b≤0.5, 0≤c≤0.05); $Li_aNi_{1-b-c}Co_bB_cD_\alpha$ (0.90≤a≤1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0<α<2); $Li_aNi_{1-b-c}Mn_bB_cD_\alpha$ (0.90≤a≤1.8, 0≤b≤0.5, 0≤c≤0.05, 0<α≤2); $Li_aNi_{1-b-c}Mn_bB_cO_{2-\alpha}F_\alpha$ (0.90≤a≤1.8, 0≤b≤0.5, 0≤c≤0.05, 0<α<2); $Li_aNi_{1-b-c}Mn_bB_cO_{2-\alpha}F_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In some embodiments, the positive active material may be lithium cobalt oxide, lithium nickel cobalt manganese oxide, lithium nickel cobalt aluminum oxide, or a combination thereof.

The binder improves the binding properties of the positive active material particles with one another and with the current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material improves the conductivity of the electrode. Any suitable electrically conductive material may be used as the conductive material, so long as it does not cause a chemical change in the battery. Non-limiting examples of the conductive material include one or more of natural graphite, artificial graphite, carbon black, acetylene black, ketjen black, a carbon fiber; a metal powder, a metal fiber, and/or the like of copper, nickel, aluminum, silver, and/or the like; a conductive material such as a polyphenylene derivative and/or the like.

The negative electrode includes a negative current collector and a negative active material layer on the negative current collector.

The negative current collector may be a copper foil, a nickel foil, a stainless steel foil, a titanium foil, a nickel foam, a copper foam, a polymer substrate coated with a conductive metal, or a combination thereof, but is not limited thereto.

The negative active material layer includes a negative active material, a binder, and, optionally, a conductive material.

The negative active material may be a material capable of reversibly intercalating/deintercalating lithium ions, a lithium metal, a lithium metal alloy, a material capable of doping and dedoping lithium, or a transition metal oxide.

The material capable of reversibly intercalating/deintercalating lithium ions may be any suitable carbon-based negative active material commonly used in connection with rechargeable lithium batteries, and non-limiting examples thereof include crystalline carbon, amorphous carbon, and mixtures thereof. Non-limiting examples of the crystalline carbon include graphite such as amorphous, sheet-shaped, flake-shaped, spherically-shaped or fiber-shaped natural or artificial graphite, and non-limiting examples of the amorphous carbon include soft carbon or hard carbon, a mesophase pitch carbonized product, fired coke, and the like.

The lithium metal alloy may be an alloy of lithium and at least one metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, $SiO_x$, (0<x<2), a Si—C composite, a Si—Y alloy (where Y is an alkali metal, an alkaline-earth metal, a Group 13 to 16 element, a transition metal, a rare earth element, or a combination thereof, and Y is not Si), Sn, $SnO_2$, a Sn—C composite, Sn—Y (where Y is an alkali metal, an alkaline-earth metal, a Group 13 to 16 element, a transition metal, a rare earth element, or a combination thereof, and Y is not Sn), and the like. At least one of the above-described compounds may be mixed with $SiO_2$. Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

The transition metal oxide may be vanadium oxide, lithium vanadium oxide, or the like, but the transition metal oxide is not limited thereto.

The binder improves the binding properties of the negative active material particles with one another and with the current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder may include a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxymethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 parts by weight to 3 parts by weight based on 100 parts by weight of the negative active material.

The conductive material improves the electrical conductivity of the electrode. Any suitable electrically conductive material may be used as the conductive material, so long as it does not cause a chemical change in the battery. Non-limiting examples of the conductive material include a carbon-based material such as natural graphite, artificial graphite, carbon black, acetylene black, ketjen black, a carbon fiber, and the like; a metal-based material such as a metal powder, a metal fiber, and/or the like of copper, nickel, aluminum, silver, and/or the like; a conductive polymer such as a polyphenylene derivative and/or the like; and mixtures thereof.

The positive electrode and the negative electrode may each be manufactured by a method including mixing the respective active material, the binder, and the conductive material to prepare an active material composition, and coating the active material composition on the current collector. The electrode manufacturing method should be apparent to those of ordinary skill in the art. In some embodiments, the solvent includes N-methylpyrrolidone, water and/or the like, but is not limited thereto.

The separator may include any suitable materials commonly used in connection with lithium batteries, so long as the materials are capable of separating the negative electrode from the positive electrode and providing a passage for the transport of lithium ions. In other words, the separator may have low resistance to ion transportation and good electrolyte impregnation capacity. Non-limiting examples of the separator include a glass fiber separator, a polyester separator, a polyethylene separator, a polypropylene separator, a polytetrafluoroethylene (PTFE) separator, and combinations thereof. The separator may be a non-woven fabric or a woven fabric. In some embodiments, a polyolefin-based polymer separator, such as a polyethylene separator, a polypropylene separator or the like may be used for a lithium ion battery. In order to facilitate the desired (or suitable) heat resistance and/or mechanical strength, a coated separator including a ceramic component or a polymer material may be used. The coated separator may have a mono-layered or a multi-layered structure.

A rechargeable lithium battery including the electrolyte of embodiments of the present invention may have improved stability and performance.

Hereinafter, embodiments are illustrated with reference to certain examples. However, these examples are provided for illustrative purposes only, and should not in any sense be interpreted as limiting the scope of the present invention.

Furthermore, what is not described in this disclosure should be apparent to those of ordinary skill in the art of lithium batteries.

Examples 1 and 2 and Comparative Examples 1 to 7

$LiCoO_2$, polyvinylidene fluoride, and carbon black (in a weight ratio of 96:2:2, respectively) were added to an N-methylpyrrolidone (NMP) solvent, thus preparing a slurry. The slurry was coated on an aluminum (Al) thin film, and then was dried and compressed, thus manufacturing a positive electrode.

Graphite (a mixture of artificial graphite and natural graphite), carboxymethyl cellulose, and styrene-butadiene rubber (in a weight ratio of 98:1:1, respectively) were added to distilled water, thus manufacturing a slurry. The slurry was coated on a copper foil, and then was dried and compressed, thus manufacturing a negative electrode.

An electrolyte for each of Examples 1 and 2 and Comparative Examples 1 to 7 was prepared by adding a lithium salt and an additive to an organic solvent in a respective composition as provided in Table 1.

In each of Examples 1 and 2 and Comparative Examples 1 to 7, a polyethylene separator was included together with the positive and negative electrodes and the electrolyte, thus manufacturing a rechargeable lithium battery cell.

TABLE 1

|  |  | Examples | | Comparative Examples | | | | | | |
|---|---|---|---|---|---|---|---|---|---|---|
|  |  | 1 | 2 | 1 | 2 | 3 | 4 | 5 | 6 | 7 |
| Lithium salt | $LiPF_6$(M) | 0.9 | 0.9 | 0.9 | 0.9 | 0.9 | 0.9 | 0.9 | 0.9 | 0.9 |
| Organic solvent | EC (volume %) | 29 | 29 | 30 | 30 | 30 | 30 | 30 | 29 | 30 |
|  | EP (volume %) | 19 | 19 | 20 | 19 | 20 | 19 | 19 | 19 | 19 |
|  | DEC (volume %) | 48 | 47 | 50 | 49 | 50 | 49 | 49 | 48 | 49 |
|  | Fluoroalkyl ether of Chemical Formula 7 (volume %) | 2 | 1 | — | — | — | 2 | 2 | 2 | — |
|  | Sulfolane (volume %) | 2 | 4 | — | 2 | — | — | — | 2 | 2 |
| Additive | Phosphazene of Chemical Formula 6 (parts by weight) | 5 | — | — | 7 | 7 | 7 | — | — | — |
|  | Phosphazene of Chemical Formula 4 (parts by weight) | — | 3 | — | — | — | — | — | — | — |

Chemical Formula 4

Chemical Formula 6

Chemical Formula 7

In Table 1, "EC" denotes ethylene carbonate, "EP" denotes ethylpropionate, and "DEC" denotes diethyl carbonate.

In addition, "parts by weight" are based on 100 parts by weight of the entire weight of the organic solvent.

Evaluation 1: Flame Retardancy of Electrolyte

Viscosity, ion conductivity, flash point and self-extinguishing time (SET) of each of the electrolytes according to Examples 1 and 2 and Comparative Examples 1 to 7 were measured, and the results are provided in the following Table 2.

The viscosity was measured using a Model SV-10 Viscometer produced by A&D Company, Limited. Specifically, the viscosity was measured by preparing 80 g of a specimen at a set or predetermined temperature, inserting a pendulum and a temperature sensor up to a set or predetermined depth therein, waiting until the temperature reached the desired mark, and reading the value displayed on the viscosity meter.

The ion conductivity was measured using a Model CM-30R Conductivity Meter produced by DKK-TOA Corporation. Specifically, the ion conductivity was measured by preparing 80 g of a specimen at a set or predetermined temperature, inserting a detecting probe in the specimen, and reading the value displayed on the conductivity meter after the conductivity depending on the temperature was stabilized.

The flash point was measured using a Model HFP382 produced by Walter Herzog GmbH. Specifically, the flash point was measured by preparing 50 ml of a specimen, inserting the specimen into a measurement cell, setting the temperature of the cell at 15° C., igniting the specimen with a measurement instrument at every 0.5° C. intervals while increasing the temperature of the cell at a rate of 1° C./min, and measuring the lowest temperature at which the vaporized specimen ignited.

The self-extinguishing time (SET) was measured by pouring 0.3 g of the electrolyte into the cap of a coin cell, bringing the electrolyte in contact with a flame for about one second using a torch (refer to International Standard ASTM D93-11, JIS K 2265:1996), and examining whether the electrolyte would catch on fire. The results of the test are provided in Table 2, where "nonflammable" indicates that the electrolyte did not catch on fire even when contacted by the flame more than three times, and numbers indicate the time (in seconds) that it took for the fire to self-extinguish if the electrolyte ignited.

TABLE 2

|  | Viscosity (cP) | Ion conductivity (mS/cm) | Flash point (° C.) | SET (sec/0.3 g) |
|---|---|---|---|---|
| Example 1 | 4.48 | 6.48 | 38.0 | Nonflammable |
| Example 2 | 4.72 | 6.64 | 32.0 | Nonflammable |
| Comparative Example 1 | 4.35 | 6.92 | 24.0 | 29 |
| Comparative Example 2 | 4.48 | 6.46 | 40.0 | Nonflammable |
| Comparative Example 3 | 4.538 | 6.57 | 35.0 | Nonflammable |
| Comparative Example 4 | 4.54 | 6.40 | 36.0 | Nonflammable |
| Comparative Example 5 | 4.36 | 6.87 | 29 | 26 |
| Comparative Example 6 | 4.36 | 6.83 | 30.5 | 23 |
| Comparative Example 7 | 4.35 | 6.90 | 27 | 27 |

Referring to Table 2, the electrolytes of Examples 1 and 2, which included an electrolyte including the sulfur-containing compound represented by Chemical Formula 1, a fluoroalkyl ether, and the phosphazene compound represented by Chemical Formula 3, showed significantly better flame retardancy as compared to the electrolytes of Comparative Examples 1 and 5 to 7. While the electrolytes of Comparative Examples 2 to 4 showed good flame retardancy, they exhibited more deteriorated cycle-life characteristics as compared to the electrolytes of the Examples. Accordingly, a rechargeable lithium battery cell including the electrolyte according to one or more embodiments of the present invention may simultaneously have improved cycle-life characteristics and safety.

Evaluation 2: Penetration Characteristics of Rechargeable Lithium Battery Cell

Penetration characteristics of each of the five rechargeable lithium battery cells according to each of Examples 1 and 2 and Comparative Examples 1 to 7 were evaluated by a penetration limit evaluation test, and the results are provided in the following Table 3.

The penetration limit evaluation test was performed using a 2.5 mm nail at a penetration speed of 40 mm/s, after overcharging the cells at 4.5 V, and the voltage and/or temperature profile during the penetration of each of the cells was obtained by attaching a temperature sensor and/or a voltage sensor on the surface of the cells.

TABLE 3

|  | Stability |
|---|---|
| Example 1 | L1 L1 L1 L1 L1 |
| Example 2 | L1 L1 L4 L1 L1 |
| Comparative Example 1 | L4 L4 L4 L1 L4 |
| Comparative Example 2 | L1 L1 L1 L1 L1 |
| Comparative Example 3 | L1 L1 L1 L4 L1 |
| Comparative Example 4 | L1 L1 L1 L1 L1 |
| Comparative Example 5 | L1 L4 L4 L4 L4 |
| Comparative Example 6 | L4 L1 L4 L4 L1 |
| Comparative Example 7 | L4 L4 L4 L5 L1 |

Evaluation results L0 to L5 are as follows.
L0: no leak;
L1: occurence of a leak, and heat of less than 150° C. was generated;

L2: heat of less than 200° C. was generated;
L3: smoke was produced, and heat of greater than 200° C. was generated;
L4: flame generated;
L5: explosion.

Referring to Table 3, the cells according to Examples 1 and 2, which included an electrolyte including the sulfur-containing compound of Chemical Formula 1, a fluoroalkyl ether, and the phosphazene compound of Chemical Formula 3, showed significantly better penetration characteristics as compared to the cells of Comparative Examples 1 and 5 to 7. While the cells of Comparative Examples 2 to 4 showed similar penetration characteristics as the cells of the Examples, they exhibited more deteriorated cycle-life characteristics as compared to the cells of the Examples. Accordingly, a rechargeable lithium battery cell including the electrolyte according to one or more embodiments of the present invention may simultaneously have improved cycle-life characteristics and safety.

Evaluation 3: Cycle-Life Characteristics of Rechargeable Lithium Battery Cell

Figure 2:
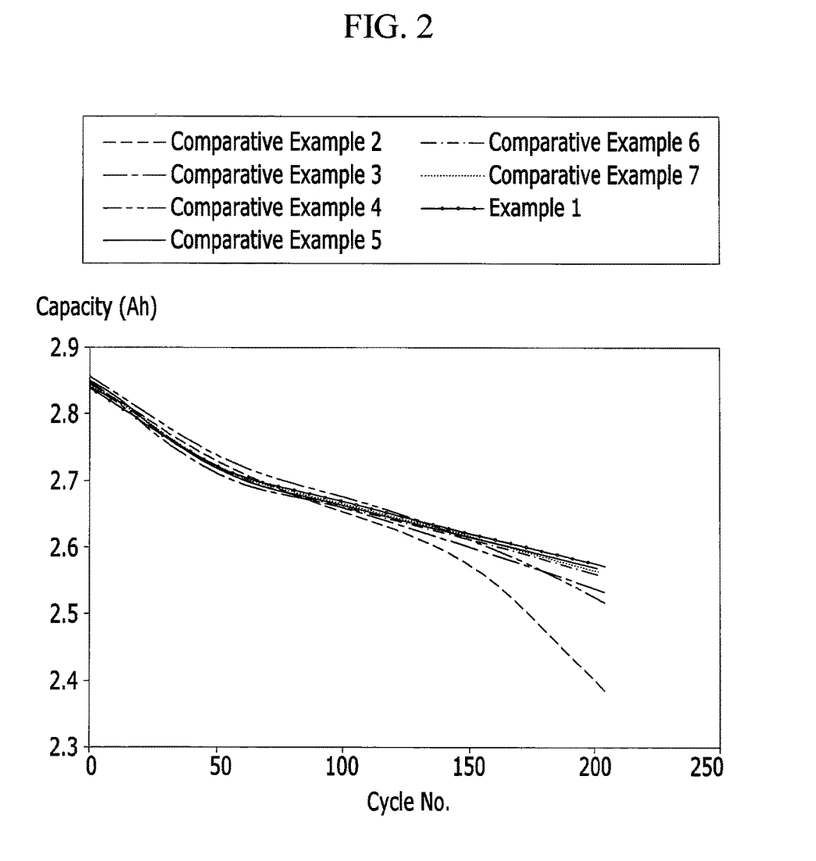
FIG. 2 is a graph comparing the cycle-life characteristics of the rechargeable lithium battery cells prepared according to Example 1 and Comparative Examples 2 to 7.

The rechargeable lithium battery cells according to Example 1 and Comparative Examples 2 to 7 were charged and discharged under the following conditions, their cycle-life characteristics were evaluated, and the results are provided in FIG. 2.

A cycle was performed by charging the cells at constant current and constant voltage, (4.4V, 1 C, 0.1 C cut-off) and discharging them at constant current, (3V and 1 C). Then, the cells were charged at constant current and constant voltage, (4.4V, 0.2 C, 0.02 C cut-off) and discharged at constant current, (0.2 C, 2.75V cut-off) at every 50th cycle.

FIG. 2 is a graph showing cycle-life characteristics of the rechargeable lithium battery cells according to Example 1 and Comparative Examples 2 to 7.

Referring to FIG. 2, the cell of Example 1, which included an electrolyte including the sulfur-containing compound represented by Chemical Formula 1, a fluoroalkyl ether, and the phosphazene compound represented by Chemical Formula 3, showed significantly better cycle-life characteristics as compared to the cells of Comparative Examples 2 to 7. While the cells of Comparative Examples 5 to 7 showed similar cycle-life characteristics as the cell of Example 1, they exhibited more deteriorated safety as compared to the cell of Example 1. Accordingly, a rechargeable lithium battery cell using the electrolyte according to one or more embodiments of the present invention may simultaneously have improved cycle-life characteristics and safety.

While certain exemplary embodiments have been described, it is to be understood that the disclosure is not limited to the disclosed embodiments, but, on the contrary, is intended to cover various modifications and equivalent arrangements included within the spirit and scope of the appended claims and equivalents thereof.

What is claimed is:

1. An electrolyte for a rechargeable lithium battery, comprising:
    a lithium salt;
    an organic solvent comprising a sulfur-containing compound represented by Chemical Formula 1 and a fluoroalkyl ether, the fluoroalkyl ether being present in the organic solvent in an amount of about 1% by volume to about 10% by volume based on the total volume of the organic solvent; and
    an additive comprising a phosphazene compound represented by Chemical Formula 3:

Chemical Formula 1 wherein $R^1$ to $R^8$ are each independently selected from the group consisting of a hydrogen atom, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C6 to C30 cycloalkynyl group, a substituted or unsubstituted C6 to C30 aryl group, and combinations thereof;

Chemical Formula 3 wherein:

$X^1$ to $X^5$ are each independently a halogen or a halogen-containing group, and $Z$ is $NR^9R^{19}$ or $OR^{11}$, wherein:

$R^9$ and $R^{19}$ are each independently selected from the group consisting of a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C1 to C30 haloalkyl group, a substituted or unsubstituted C6 to C30 aryl group, a substituted or unsubstituted C6 to C30 halogenated aryl group, a substituted or unsubstituted C7 to C20 arylalkyl group, a substituted or unsubstituted C1 to C20 heteroalkyl group, a substituted or unsubstituted C2 to C30 heterocycloalkyl group, a substituted or unsubstituted C2 to C30 heteroaryl group, a substituted or unsubstituted C1 to C20 aldehyde, and combinations thereof, and

$R^{11}$ is a substituted or unsubstituted C1 to C30 alkyl group.

2. The electrolyte for a rechargeable lithium battery of claim 1, wherein $R^1$ to $R^8$ are each independently a hydrogen atom or a substituted or unsubstituted C1 to C30 alkyl group.

3. The electrolyte for a rechargeable lithium battery of claim 1, wherein the sulfur-containing compound is present in an amount of about 1% by volume to about 20% by volume based on the total amount of the organic solvent.

4. The electrolyte for a rechargeable lithium battery of claim 1, wherein the fluoroalkyl ether is represented by Chemical Formula 2:

Chemical Formula 2 wherein $R^{12}$ and $R^{13}$ are each independently a C1 to C10 alkyl group substituted with at least one fluorine atom.

5. The electrolyte for a rechargeable lithium battery of claim 4, wherein $R^{12}$ and $R^{13}$ are each independently a C1 to C6 alkyl group substituted with 5 to 12 fluorine atoms.

6. The electrolyte for a rechargeable lithium battery of claim 4, wherein the C1 to C10 alkyl group is a linear C1 to C10 alkyl group.

7. The electrolyte for a rechargeable lithium battery of claim 1, wherein at least one of $X^1$ to $X^5$ is a halogen.

8. The electrolyte for a rechargeable lithium battery of claim 1, wherein $X^1$ to $X^5$ are each independently a halogen.

9. The electrolyte for a rechargeable lithium battery of claim 1, wherein $X^1$ to $X^5$ are each independently a fluorine atom.

10. The electrolyte for a rechargeable lithium battery of claim 1, wherein Z is $NR^9R^{10}$, and $R^9$ and $R^{10}$ are each independently a substituted or unsubstituted C1 to C30 alkyl group or a substituted or unsubstituted C1 to C30 cycloalkyl group.

11. The electrolyte for a rechargeable lithium battery of claim 1, wherein Z is $OR^{11}$, and $R^{11}$ is a substituted or unsubstituted C1 to C30 alkyl group.

12. The electrolyte for a rechargeable lithium battery of claim 1, wherein Z is $OR^{11}$, and $R^{11}$ is a substituted or unsubstituted C1 to C5 alkyl group.

13. The electrolyte for a rechargeable lithium battery of claim 1, wherein the phosphazene compound is represented by any one of Chemical Formulae 4 to 6:

Chemical Formula 4

Chemical Formula 5

Chemical Formula 6

14. The electrolyte for a rechargeable lithium battery of claim 1, wherein the phosphazene compound is present in an amount of about 1 part by weight to about 20 parts by weight based on 100 parts by weight of the organic solvent.

15. The electrolyte for a rechargeable lithium battery of claim 1, wherein the organic solvent further comprises a carbonate-based compound selected from the group consisting of diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and combinations thereof.

16. The electrolyte for a rechargeable lithium battery of claim 1, wherein the additive further comprises fluoroethylene carbonate, vinylethylene carbonate, propane sultone, succinonitrile, adiponitrile, $LiBF_4$, or a combination thereof.

17. The electrolyte for a rechargeable lithium battery of claim 1, wherein the electrolyte has a viscosity of less than or equal to about 8 cP.

18. The electrolyte for a rechargeable lithium battery of claim 1, wherein the electrolyte has an ion conductivity of greater than or equal to about 5 mS/cm.

19. A rechargeable lithium battery, comprising:
a positive electrode;
a negative electrode;
a separator; and
the electrolyte of claim 1.

* * * * *